R. E. MEYER.
ROTARY VALVE GAS ENGINE.
APPLICATION FILED AUG. 19, 1912.

1,125,586.

Patented Jan. 19, 1915.
4 SHEETS—SHEET 1.

Witnesses
Chas. W. Stauffiger
Anna M. Dorr

Inventor
Richard E. Meyer
By
Attorneys

R. E. MEYER.
ROTARY VALVE GAS ENGINE.
APPLICATION FILED AUG. 19, 1912.
1,125,586.
Patented Jan. 19, 1915.
4 SHEETS—SHEET 2.
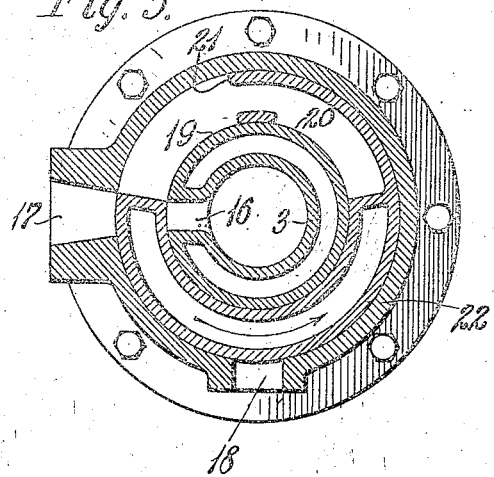
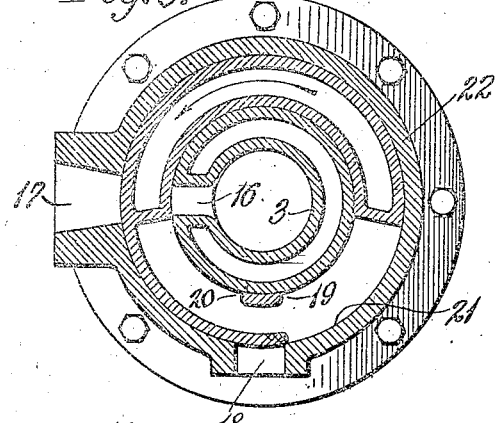
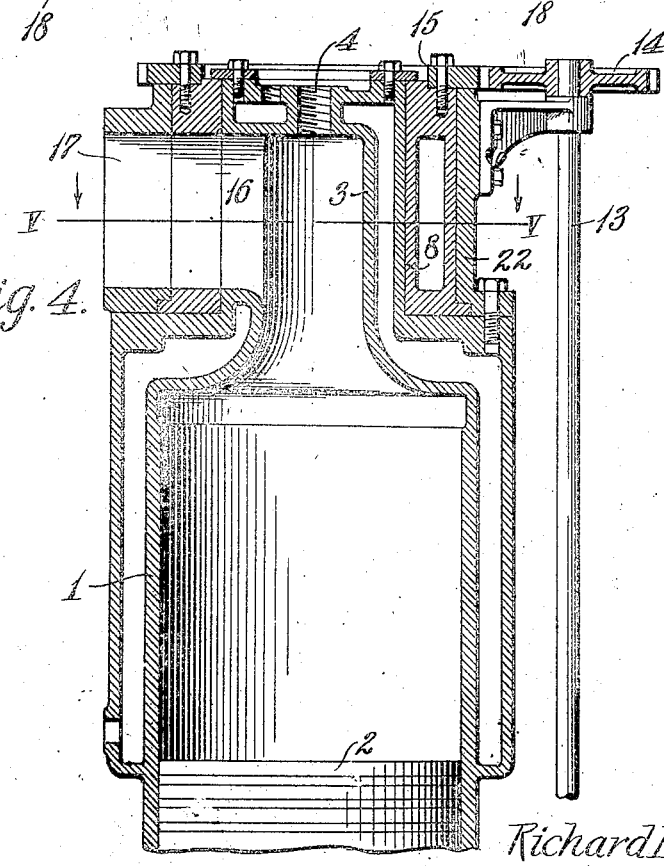

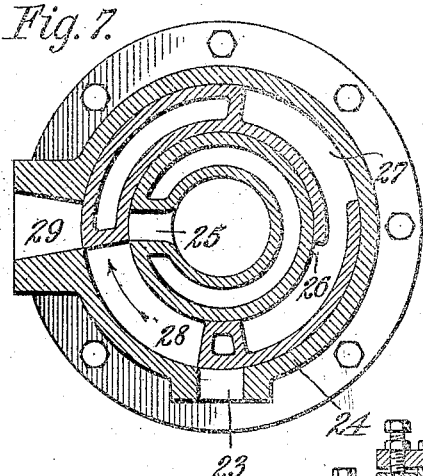
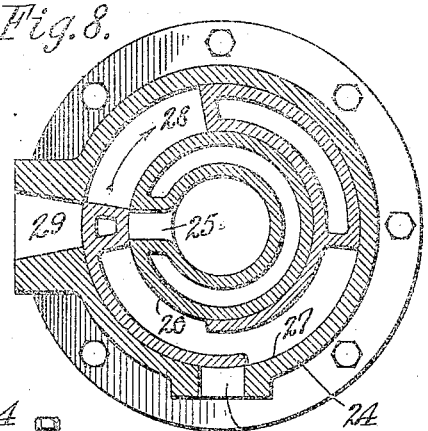
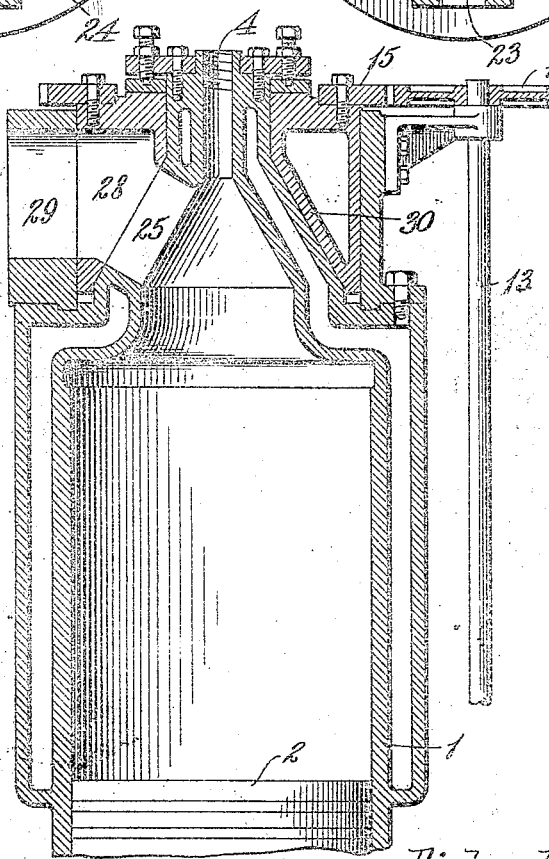

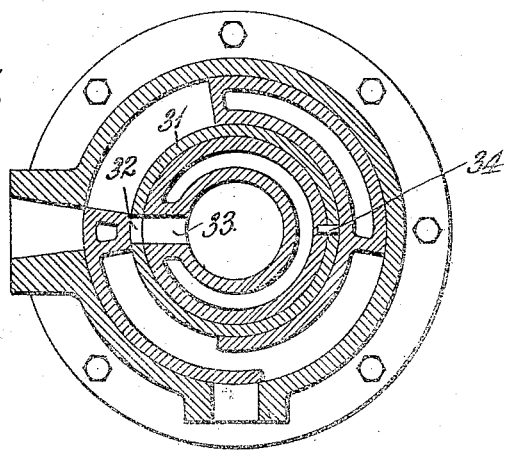
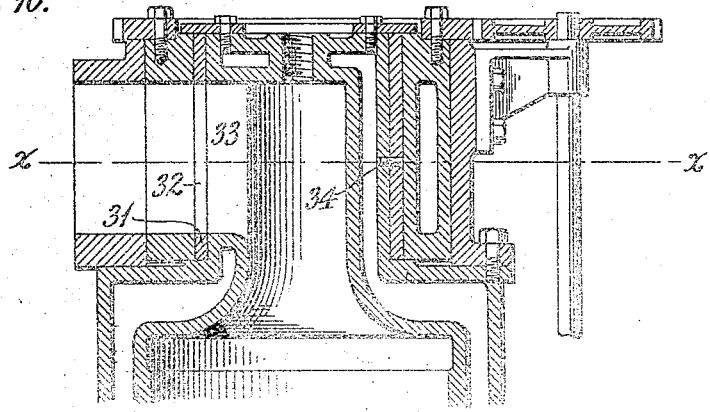
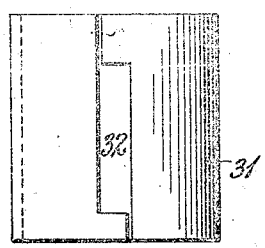

UNITED STATES PATENT OFFICE.

RICHARD E. MEYER, OF DETROIT, MICHIGAN.

ROTARY-VALVE GAS-ENGINE.

1,125,586.  Specification of Letters Patent.  Patented Jan. 19, 1915.

Application filed August 19, 1912. Serial No. 715,705.

*To all whom it may concern:*

Be it known that I, RICHARD E. MEYER, a citizen of the United States of America, residing at Detroit, in the county of Wayne and State of Michigan, have invented certain new and useful Improvements in Rotary-Valve Gas-Engines, of which the following is a specification, reference being had therein to the accompanying drawings.

This invention relates to valves for explosive engines and to an arrangement thereof whereby a single port in the compression end of a cylinder is used for both inlet and exhaust purposes, the valve being so disposed as to be balanced to a large extent and being arranged to work noiselessly and with a minimum of liability to leakage.

The invention consists in the matters hereinafter set forth and more particularly pointed out in the appended claims.

Figure 2:
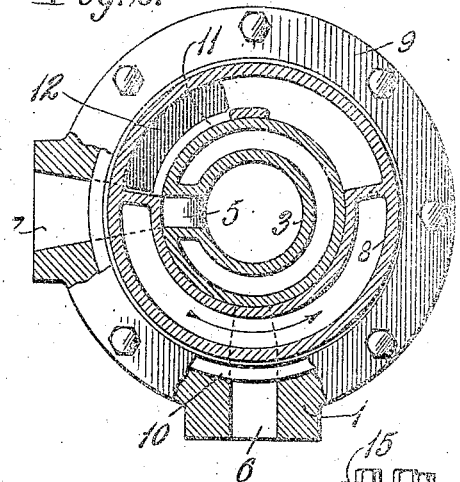
Figure 3:
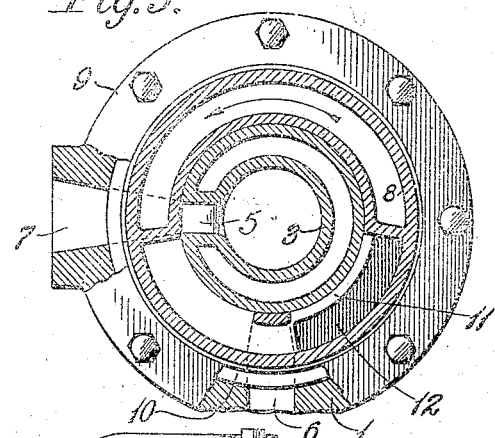
Figure 1:
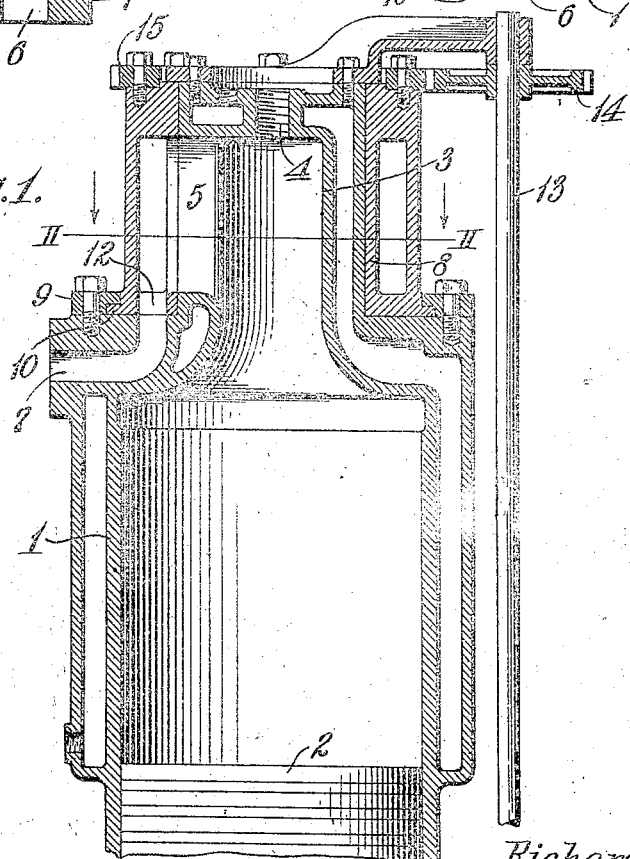

In the drawings, Figure 1 is a view in longitudinal section of a cylinder equipped with a valve that embodies features of the invention, with the piston at the end of its outstroke; Fig. 2 is a view in cross section taken on or about line II—II of Fig. 1 showing the valves at the beginning of the exhaust; Fig. 3 is a view taken on the same section as Fig. 2 but with the valve in compression position; Fig. 4 is a view in longitudinal section of a cylinder with a valve that is slightly modified, the ports being extended through the outer wall of the cylinder; Fig. 5 is a view in section on line V—V of Fig. 4 showing the valve at the beginning of the exhaust; Fig. 6 is a view in section on the same line showing the valve in closed or compression position; Fig. 7 is a view in transverse section of a further modification of the valve, showing the parts before the exhaust takes place; Fig. 8 is a view in transverse section of this modification showing the parts just before the intake; Fig. 9 is a view in longitudinal section illustrating a valve of conoidal form that is also an embodiment of the invention; Fig. 10 is a view in vertical section of a valve showing one arrangement of a packing ring; Fig. 11 is a view in transverse section on or about line X—X of Fig. 10; and Fig. 12 is a view in detail of the packing ring itself.

In the drawings, a cylinder 1 of standard type is equipped with a piston 2 and has a compression chamber whose wall 3, that is preferably water jacketed, is provided with a spark plug opening 4 in its head and a single port 5 that may be placed in connection either with an intake duct 6 through the upper portion of a cylinder wall proper or with an exhaust passage 7. A cylindrical valve body 8 is preferably hollow, is rotatably secured on the compression chamber wall 3 as by means of a clamping ring 9 that overlies an annular flange 10 at the lower end of the valve, the latter abutting the annular face formed by the shoulder on the upper end of the cylinder. The inner portion of the wall 8 of the valve has a port 11 therethrough that is in communication with an end port 12 which is brought successively into registration with the intake 6 and the exhaust 7 as the valve turns. Port 11 is so disposed that it may uncover the port 5 when the port 12 is in register with the intake 6 or throw the exhaust port 7 into communication with the port 5 through the opening 12 during a sufficient length of time for the scavenging of the engine to be completed. These ports are so disposed in relation to the intake and exhaust passages that the latter are alternately opened and closed throughout the rotative movement of the valve. The valve is rotated by any suitable means as for example, by a shaft 13 geared to the engine shaft and provided with a pinion 14 which meshes with an annular gear 15 on the upper end of the sleeve, the pinion and gear being of proper ratio to turn the valve in operative relation to the piston stroke. As a result of this construction the downstroke of the cylinder occurs while the port 11 is in communication with the port 5 and the port 12 in register with the duct 6. On the upstroke of the piston the port 5 is sealed and remains so during the explosion outstroke of the piston. On the scavenging upstroke of the piston the port 11 is in register with the port 5 and the port 12 with the exhaust passage 7. It is to be understood that the necessary packing rings are provided and arrangements made for proper lubrication.

In Figs. 4, 5 and 6 a port 16 in the compression chamber of the cylinder may be brought into register successively with a lateral exhaust port 17 and intake port 18 by means of a pair of inner ports 19 and 20 in the valve wall and the outlet 21 in the outer valve wall, the latter being constantly in communication with both the openings 19 and 20. This construction entails the use of an outer cylinder sleeve 22 in which the ports 17 and 18 are formed, the valve being otherwise driven as in the other construction.

To prevent pocketing of exhausted gases in the valve, the arrangement shown in Figs. 7 and 8 may be used in which an intake port 23 in an outer jacket 24, is brought into communication with a cylinder port 25 through an inner opening 26 in the inner valve wall, and an outer opening 27 in the outer wall, while the exhaust takes place from the cylinder port 25 through a valve opening 28 and outlet 29. This prevents contamination of the incoming gas by any exhausted charge which might otherwise lodge or be held in the valve walls.

In Fig. 9, a valve 30 is shown that is conoidal to reduce the liability to leakage, the ports and driving means being arranged as in the ring type of valve.

In Figs. 10, 11 and 12, one form of packing which prevents leaking around the port of the chamber is shown. This consists of a split band or ring 31 having an opening indicated at 32, preferably formed at its separated ends which registers with the port 33 of the explosion chamber, the ring being prevented by a keeper pin 34 from shifting. The opening in the ring may correspond to the size of the port 33 or may be varied therefrom in order to change the time of registration with the valve openings or to shift the lead slightly. The ring therefore affords not only effective means for prevention of leakage but also a ready way for slightly changing the outlet of the chamber port. Furthermore as the ring is readily renewable, the port mouth which is traversed by the valve and is therefore subject to wear may be kept in proper shape by simply changing or refitting the ring as desired.

A valve of this description with a cylinder of single port presents minimum chance for leakage, is noiseless and positive in its operation and by proper proportioning of the ports gives ample opportunity for complete scavenging and rapid intake.

Obviously, changes in the details of construction may be made without departing from the spirit of my invention and I do not care to limit myself to any particular form or arrangement of parts.

What I claim is:—

1. The combination of an engine cylinder having inlet and exhaust ports and the upper end of said cylinder terminating in a chamber having vertical walls provided with a single lateral port, a vertically disposed annular valve revolubly mounted on said engine cylinder exteriorly of said chamber and engaging the walls thereof, said valve having a segment shaped port adapted to alternately establish communication between the inlet port of said cylinder and the single port of said chamber and the exhaust port of said cylinder and the single port of said chamber, and means for rotating the valve in timed relation to the engine cycle.

2. In an explosive engine, the combination of a cylinder having an explosive chamber with a single port, an annular hollow valve rotatively mounted upon said chamber and having the walls thereof provided with segment-shaped communicating inlet and outlet openings, and a sleeve surrounding the valve having an inlet and an exhaust port that are successively brought into communication with the chamber port by the openings in the walls of said valve.

3. In an explosive engine, the combination of a cylinder having an explosion chamber with a single port, an annular hollow valve rotatable upon the chamber and having the inner wall provided with an outlet opening adapted to register with the single port of said explosion chamber, said valve having the outer wall thereof provided with an inlet opening, a sleeve surrounding the valve having inlet and exhaust ports that are successively brought into communication with the chamber port through the medium of the openings of the walls of said valve, and gearing operatively connecting the valve to the engine shaft and moving it in timed relation thereto.

4. In an explosive engine the combination of a cylinder having a compression chamber and a lateral port therein, with a double walled annular valve journaled on the chamber, a sleeve encircling the valve having an exhaust port and an inlet port, the valve having communicating exhaust openings through its inner and outer wall adapted to throw the chamber port into communication with the sleeve exhaust port and also having inlet openings in its inner and outer wall adapted to throw the inlet port of the sleeve into communication with the chamber port, and means for rotating the valve in timed relation to the engine cycle.

5. In an explosive engine, the combination of a cylinder having a compression chamber with a single lateral port, of a packing ring encircling the chamber and having an opening in registration with the cylinder port, and an annular valve journaled on the chamber around the ring and provided with intake and exhaust openings adapted to successively register with the opening of the ring.

6. In an explosive engine, the combination of a cylinder having a compression chamber with a single lateral port, of a packing ring encircling the chamber and having an opening in registration with the cylinder port, a keeper for holding the ring in position, an annular valve journaled on the chamber around the ring and provided with intake and exhaust openings adapted to successively register with the opening of the ring, and means for rotating the valve in timed relation to the engine cycle.

In testimony whereof I affix my signature in presence of two witnesses.

RICHARD E. MEYER.

Witnesses:
 RAYMOND A. SCHMIDT,
 OTTO F. BARTHEL.